(12) United States Patent
Haka

(10) Patent No.: US 6,287,233 B1
(45) Date of Patent: Sep. 11, 2001

(54) POWERTRAIN WITH A FIVE SPEED PLANETARY TRANSMISSION

(75) Inventor: Raymond James Haka, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/447,248

(22) Filed: Nov. 23, 1999

(51) Int. Cl.$^7$ ........................................................ F16H 3/62
(52) U.S. Cl. ............................ 475/276; 475/280; 475/281
(58) Field of Search ........................................ 475/275, 276, 475/277, 278, 279, 280, 281

(56) References Cited

U.S. PATENT DOCUMENTS

| | | | |
|---|---|---|---|
| 3,971,267 | * | 7/1976 | Murakami et al. ................. 475/276 |
| 3,987,690 | * | 10/1976 | Murakami et al. ................. 475/276 |
| 4,038,888 | * | 8/1977 | Murakami et al. ................. 475/276 |
| 4,089,239 | * | 5/1978 | Murakami et al. ................. 475/276 |
| 5,261,862 | * | 11/1993 | Pierce ................................. 475/276 |
| 5,533,945 | * | 7/1996 | Martin et al. ...................... 475/276 |
| 5,536,220 | * | 7/1996 | Martin ................................. 475/276 |

* cited by examiner

Primary Examiner—Sherry Estremsky
(74) Attorney, Agent, or Firm—Laura C. Hargitt

(57) ABSTRACT

A powertrain has a planetary transmission having three interconnected planetary gear sets which are controlled with a plurality of clutches and brakes to provide five forward speed ratios and a reverse ratio. The first forward ratio is established through a first of the planetary gear sets. The second forward ratio is established through a combination of the first and a second of the planetary gear sets. The third forward ratio is a direct drive. The fourth forward ratio is established through the second planetary gear set. The fifth forward ratio is established through a combination of the second planetary gear set and a third planetary gear set. The reverse ratio is established through the second planetary gear set. The fourth and fifth forward ratios are overdrive ratios.

7 Claims, 2 Drawing Sheets

US 6,287,233 B1

POWERTRAIN WITH A FIVE SPEED PLANETARY TRANSMISSION

TECHNICAL FIELD

This invention relates to multi speed power transmissions and more particularly to five speed planetary gear arrangements having three simple planetary gear sets.

BACKGROUND OF THE INVENTION

In order to improve efficiency and performance, many current vehicles are employing powertrains that include four and five speed planetary transmissions. Some of the available powertrains simply add an overdrive planetary gear set to the transmission in an upstream power flow path relative to a four speed transmission. While effective, these systems require the addition of a brake and a clutch to control the added gear set. Other systems have developed gearing schemes using three planetary gear sets, which include configurations that have not been previously produced, requiring significant engineering design, development and testing prior to release for production use.

SUMMARY OF THE INVENTION

It is an object of the present invention to provide an improved five speed planetary transmission.

In one aspect of the present invention three planetary gear sets are interconnected to provide five forward speed ratios and one reverse ratio. In another aspect of the present invention two of the planetary gear sets are controlled to provide four forward speed ratios and the third planetary gear set cooperates with one of the other planetary gear sets to establish the fifth forward speed ratio.

In yet another aspect of the present invention, the third gear set has a brake member which is engaged to control the fifth forward speed ratio. In still another aspect of the present invention, the third gear set has a member which is driven by the transmission input through a clutch that is active in the highest three forward speed ratios. In a further aspect of the present invention, a transmission having five forward speed ratios is provided through the addition of a planetary gear set and one friction brake assembly to a four speed planetary gear set without changing the interconnections of the four speed planetary gear set.

A five speed transmission is provided through the addition of a simple planetary gear set to a four speed planetary arrangement with minimum investment. The four speed gear arrangement is lengthened to provide space centrally of the two planetary gear sets of the four speed arrangement. The simple planetary gear set and a friction brake are installed in the space provided. The transmission therefore requires a minimum of additional length and only a single friction mechanism is added.

DESCRIPTION OF AN EXEMPLARY EMBODIMENT

Figure 1:
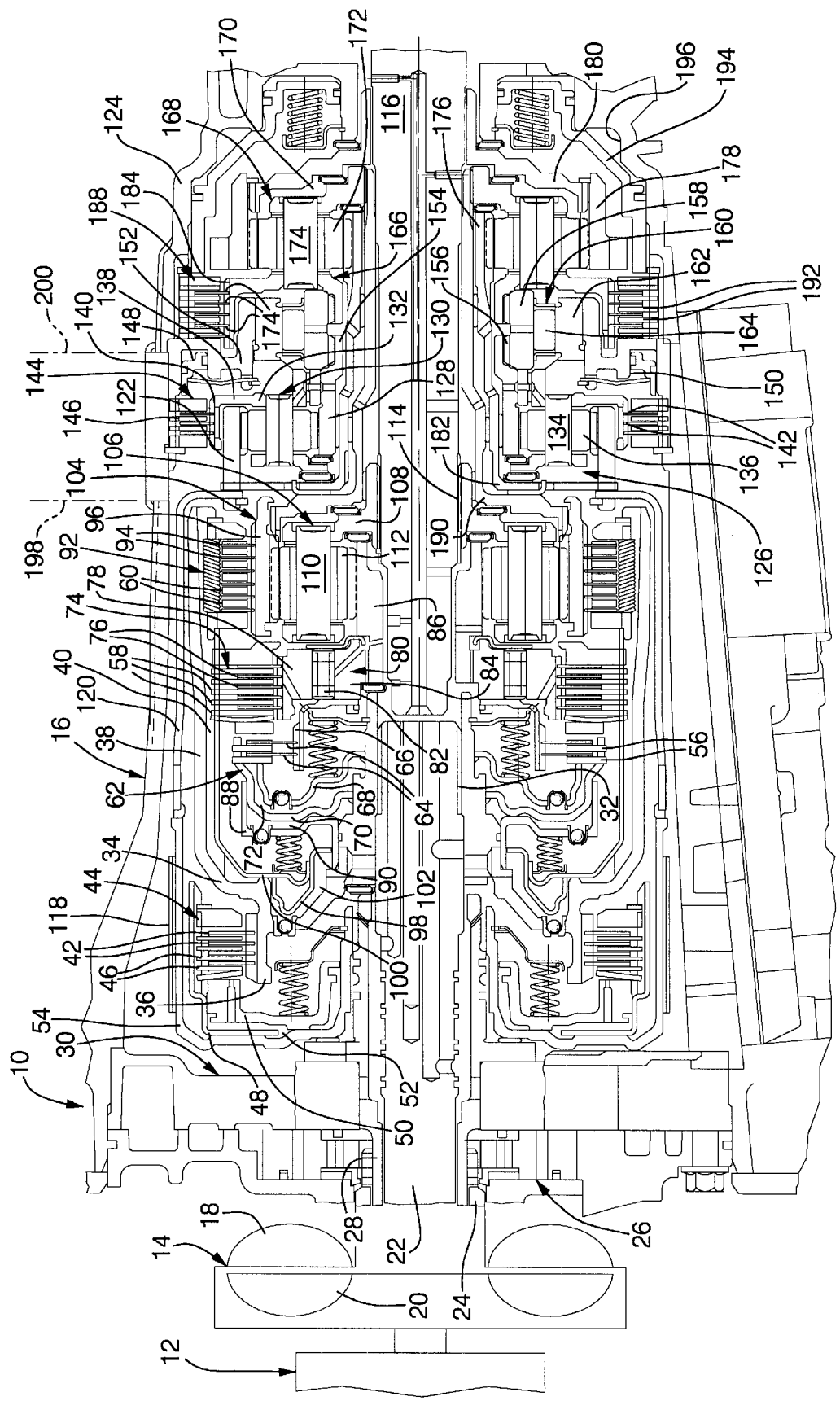
FIG. 1 is a sectional elevational view of a portion of a powertrain incorporating the present invention.

A powertrain 10 has a conventional engine 12, a conventional torque converter 14 and a multi-speed transmission 16. The torque converter 14 has an impeller 18, driven by the engine 12, and a turbine 20 drivingly connected to an input shaft 22 of the transmission 16. The impeller 18 has a hub 24 that drives a conventional hydraulic pump 26. A stator shaft 28, which supports a stator, not shown, extends through the hub 24 and is secured with a pump housing and control 30. The input shaft 22 is supported in the stator shaft 28 and terminates in a splined portion 32 that is drivingly connected with an input clutch housing 34.

The housing 34 has a splined hub 36 and a shell extension 38 which has a spline 40 formed on the interior thereof. The hub 36 is drivingly connected with a plurality of clutch plates 42 which are components of a clutch 44. The clutch 44 also includes a plurality of clutch plates 46, alternately spaced with the plates 42 and drivingly connected with a housing 48. A piston 50 is slidably disposed in the housing 48 and cooperates therewith to form an apply chamber 52 which is pressurized to cause the piston 50 to enforce frictional engagement between the clutch plates 42 and 46, thereby establishing a drive connection between the input shaft and a hub 54 secured to the housing 48.

The spline 40 of shell 38 also drivingly engages a plurality of clutch plates 56, a plurality of clutch plates 58 and a plurality of clutch plates 60. The clutch plates 56 are components of a clutch 62 that has clutch plates 64 drivingly connected with a hub 66 and a piston 68 slidably disposed in a piston 70. The pistons 68 and 70 cooperate to form an apply chamber 72 for the clutch 62 which, when pressurized, will enforce engagement of the clutch plates 58 and 60 and thereby establish a drive connection between the input shaft 22 and the hub 66.

The clutch plates 58 and the piston 72 are components of a clutch 74 which also includes a plurality of clutch plates 76 which are splined to the outer race 78 of a one-way clutch 80. The one-way clutch 80 has a plurality of rollers 82 and an inner race 84 that is secured with the hub 66 and splined to a sun gear 86. The piston 70 is slidably disposed in a hub 88 that is secured to the clutch hub 34. The piston 70 and hub 88 cooperate to form an apply chamber 90 for the clutch 74, which apply chamber 90 is pressurized to cause the piston 70 to enforce engagement of the clutch plates 58 and 76 to establish a drive connection between the input shaft 22 and the sun gear 86.

The clutch plates 60 are components of a clutch 92 which also includes a plurality of clutch plates 94, splined to a ring gear 96, and a piston 98 and piston extension 100. The piston is slidably disposed in the input clutch housing 34 and cooperates therewith to form an apply chamber 102 which, when pressurized, will cause the piston 98 to enforce engagement of the plates 60 and 94 through the extension 100. Engagement of the clutch 92 will establish a drive connection between the input shaft 22 and the ring gear 96. The clutch 74, when engaged establishes only a one-way drive from the input shaft 22 to the sun gear 86. Engagement of the clutch 62 bypasses the cone-way clutch 80 to establish a positive drive from the input shaft 22 to the sun gear 86. Engagement of the clutch 92 establishes a positive drive between the input shaft 22 and the ring gear 96.

The sun gear 86 and the ring gear 96 are components of a planetary gear set 104 which also includes a planetary carrier assembly 106. The planetary carrier assembly 106 has a cage or spider 108 and a plurality of pins 110 on each of which a pinion gear 112 is rotatably mounted. The cage 108 has a spline portion 114 which is drivingly connected with a transmission output shaft 116.

The hub 54 is encircled by a band brake 118 and includes an annular extension hub 120 which is drivingly connected with a ring gear 122. The band brake is grounded to a transmission housing 124 and is effective, when hydraulically actuated, to restrain rotation of the ring gear 122. The clutch 44, when engaged, will complete an input drive path from the input shaft 22 to the ring gear 122. The ring gear 122 is a component of a planetary gear set 126 which also includes a sun gear 128 and a planetary carrier assembly 130. The planet carrier assembly includes a cage or spider 132, a plurality of pins 134 and pinion gears 136 rotatably mounted on respective ones of the pins 134.

The cage 132 has an annular hub extension 138 on which is formed a spline 140. A plurality of brake discs 142 are splined to the hub extension 138 and are components of a brake 144. The brake 144 also includes a plurality of brake discs 146 splined to the transmission housing 124 and a piston 148 which is slidably disposed in a cavity 150 formed in a hub 152 that is fixed in the transmission housing 124. When the cavity 150 is pressurized, the piston 148 will enforce engagement of the brake discs 142 and 146 to restrain the carrier assembly 130 from rotation.

The sun gear 128 has a sleeve extension 154 with a spline portion 156. The spline portion 154 is drivingly engaged with an inner race 158 of a one-way device 160. The one-way device 160 has an outer race 162 that is secured in the hub 152 and a plurality of rollers 164 disposed between the inner race 158 and the outer race 162. The inner race 158 of the one-way device 160 is also splined to a planetary carrier assembly 166 which is a component of a planetary gear set 168.

The planetary carrier assembly 166 has a cage or spider 170 in which a plurality of pinion gears 172 are rotatably mounted on pins 174. The planetary gear set 168 also includes a sun gear 176 and a ring gear 178 which are disposed in meshing relation with the pinion gears 172. The ring gear 178 is drivingly connected with the output shaft 116 through a hub 180. The sun gear 176 is connected, through a sleeve and hub 182, with the ring gear 122 and the extension 120. As previously pointed out, the extension 120 is connected with the clutch 44 through the hub 54. Thus when the clutch 44 is engaged, the sun gear 176 will be connected with the input shaft 22.

The cage 170 has a spline portion 184 that is drivingly connected with a plurality of brake discs 186 that are components in a brake 188 disposed in parallel relation with the one-way device 160. The cage 170 is also connected with the ring gear 96 of the planetary gear set 104 through a sleeve and hub 190. The one-way device 160 prevents rotation of the ring gear 96 in a direction opposite to the engine rotation direction. The brake 188 also includes a plurality of brake discs 192 that are splined to the housing 124 and a piston 194 that is slidably disposed in a cavity 196 formed in the housing 124. When the cavity 196 is pressurized, the brake 188 is engaged such that the ring gear 96 and the carrier assembly 166 are restrained from rotation.

The clutches 44, 62, 74 and 92 and the brakes 118, 144 and 188 are conventional selectively operable friction devices that are fluid operated. These devices are controlled by a conventional electro-hydraulic control mechanism, not shown. Those skilled in the art will be familiar with the construction and operation of these types of control mechanisms and the friction devices. When compared with a conventional four speed planetary transmission, such as that shown in U.S. Pat. No. 4,086,827, only the added axial length between the lines 198 and 200 is required to accommodate the planetary gear set 126 and the brake 144 that provide the fifth forward speed when coupled with the planetary action of the planetary gear set 168.

Figure 2:
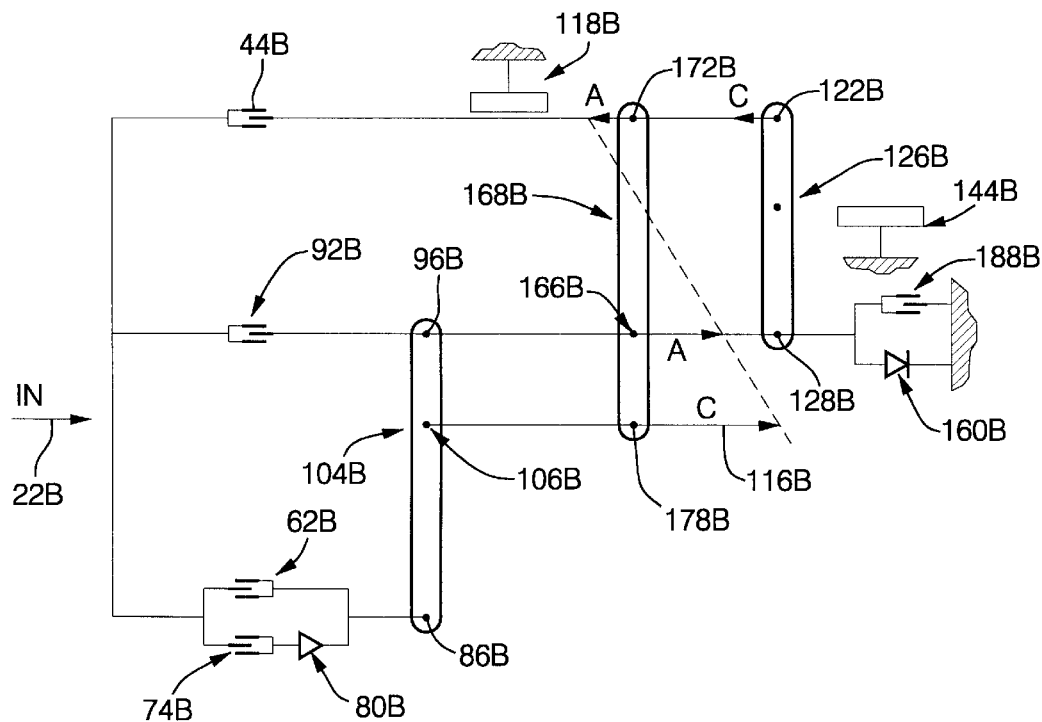
FIG. 2 is a schematic diagram of the gearing arrangement incorporating the present invention.
Figure 3:
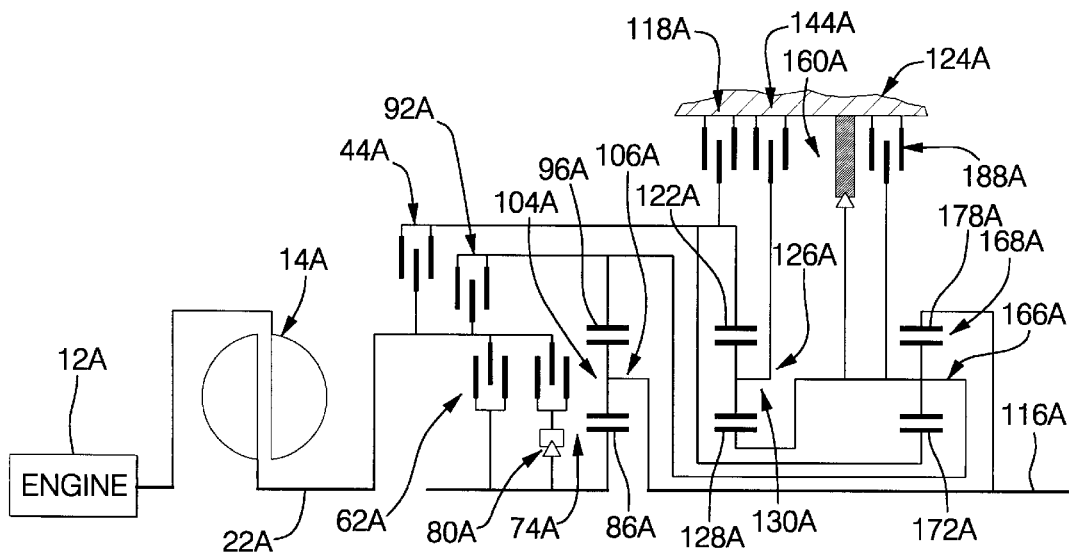
FIG. 3 is a lever diagram of the gearing incorporating the present invention.

The schematic representation shown in FIG. 2 and the lever diagram shown in FIG. 3 are simplified depictions of the transmission 16 shown in FIG. 1. The similar or corresponding components shown in FIGS. 2 and 3 will be given the same numeric designation with an "A" suffix in FIG. 2 and a "B" suffix in FIG. 3. In the lever diagram shown in FIG. 3, the gear members will be designated as nodes and the planetary gear sets will be designated as levers.

The speed ratios will be described by referring to the schematic diagram and the lever diagram. To establish the reverse drive ratio, the clutch 44A is engaged and the brake 188A is engaged. The sun gear 172A is driven forwardly, engine rotation direction, and the cage of the carrier assembly 166A is held stationary such that the ring gear 178A is rotated in reverse, opposite to engine direction. It should be noted in FIG. 3 that the nodes 172B and 178B are urged to pivot clockwise about the node 166B which results in a negative output at the node 178B.

To establish the first and lowest forward ratio, the clutch 74A is engaged to connect the sun gear 86A with the input shaft 22A. The sun gear 86A rotates forwardly and the ring gear 96A is urged to rotate in reverse, however, the one-way device 160A prevents the reverse rotation such that the carrier assembly 106A and therefore the output shaft 116A are rotated forwardly. This ratio, as described, does not provide engine coast braking. To provide coast braking in the first ratio, the clutch 62A and the brake 188A are engaged. In FIG. 3, the node 86B and the node 106B are pivoted counterclockwise about the node 96B which results in a positive output at the node 178B.

To establish the second forward ratio, the brake 118B is engaged and the brake 188B, if engaged, is released. If the brake 188B is not engaged, the one-way device 160B will overrun. There will be no coast braking in the second ratio unless the clutch 62B is engaged. In FIG. 3, the lever 168B, representing the planetary gear set 168, will pivot counterclockwise about the node 172*b* resulting in a positive output at the node 178B. It should be noted that the levers 104B and 168B are coupled at the nodes 98B–166B and the nodes 106B–178B such that a single lever combining levers 104B and 168B is effectively produced.

To establish the third forward ratio, the simultaneous interchange of the brake 118A and clutch 92A is effected. This places the planetary gear set 104A in a one to one ratio. In FIG. 3, the lever 104B is urged rightward at both node 86B and node 96B and there is no reaction or fulcrum for the lever 104B such that a positive output, equal to the input, occurs at nodes 106B and 178B. If engine coast braking is desired in the third ratio, the clutch 62A must be engaged.

To establish the fourth forward ratio, the brake 118A is engaged. The one-way clutch 80A will overrun and the clutch 62A will be simultaneously disengaged. In FIG. 3, the node 172B becomes the fulcrum for the lever 168B such that a positive input at the node 166B results in an even more positive output at the node 178B and an overdrive ratio is established.

To establish the fifth forward ratio, the simultaneous interchange of the brake 118A and the brake 144A is effected. In FIG. 3, the node 130 becomes a fulcrum for the lever 126B such that a positive input at the node 128B results in a negative reaction at the node 122B. Since node 166B has a positive input and the node 172B has a negative reaction, the node 178B will have a positive output that is greater than the output for the fourth ratio. This is represented in FIG. 3 by the arrow A as the input, the arrow B as the reaction and the arrow C as the output. This produces an overdrive ratio that provides a greater output speed for a given input speed than is available in the fourth ratio. This can also be determined in FIG. 3 if one recognizes that the arrow C will be shorter when the arrow B is non-existent.

The following tables represent an example of the gear ratios that can be attained with the present invention when the gear members are designed with the tooth counts shown.

| Gear Member | No. of Teeth |
| --- | --- |
| Sun gear 86 | 34 |
| Ring gear 96 | 66 |
| Sun gear 128 | 42 |
| Ring gear 122 | 70 |
| Sun gear 172 | 34 |
| Ring gear 178 | 70 |

| Speed range | Gear ratio |
| --- | --- |
| First | 2.94 |
| Second | 1.63 |
| Third | 1.00 |
| Fourth | 0.67 |
| Fifth | 0.56 |
| Reverse | 2.06 |

What is claimed is:

1. A powertrain having a multi-speed planetary transmission comprising:

an input shaft;

an output shaft;

three simple planetary gear sets each having a sun gear, a ring gear and a planetary carrier assembly, said planetary carrier assembly comprising a plurality of rotatable pinion gears each meshing with said sun gears and ring gears respectively, a second of said planetary gear set being physically located between a first of said planetary gear set and a third of said planetary gear set;

said planetary carrier assembly of said first planetary gear set and said ring gear of said third planetary gear set being continuously interconnected with said output shaft;

said ring gear of said first planetary gear set, said sun gear of said second planetary gear set and said planetary carrier assembly of said third planetary gear set being continuously interconnected;

said ring gear of said second planetary gear set and said sun gear of said third planetary gear set being continuously interconnected;

a first brake mechanism for selectively connecting said ring gear of said first planetary gear set, said sun gear of said second planetary gear set and said planetary carrier assembly of said third planetary gear set with a transmission housing;

a second brake mechanism for selectively connecting said planetary carrier assembly of said second planetary gear set with said transmission housing;

a third brake mechanism for selectively connecting said ring gear of said second planetary gear set and said sun gear of said third planetary gear set with said transmission housing;

a first clutch mechanism for selectively connecting said sun gear of said first planetary gear set with said input shaft;

a second clutch mechanism for selectively connecting said ring gear of said first planetary gear set, said sun gear of said second planetary gear set and said planetary carrier assembly of said third planetary gear set with said input shaft;

a third clutch mechanism for selectively connecting said ring gear of said second planetary gear set and said sun gear of said third planetary gear set with said input shaft;

said three planetary gear sets, said first, second and third clutch mechanisms and said first, second and third brake mechanisms being operable to provide a reverse speed ratio and five forward speed ratios including a first and lowest ratio and a fifth and highest ratio; and said second planetary gear set and said third planetary gear set cooperating to provide the fifth and highest forward speed ratio during the selective engagement of said second clutch mechanism and said second brake mechanism.

2. The powertrain having a multi-speed planetary transmission defined in claim 1 further comprising:

a first sleeve shaft interconnected between said ring gear of said first planetary gear set and said planetary carrier assembly of said third planetary gear set and being disposed concentric with said output shaft; and a second sleeve shaft interconnecting said ring gear of said second planetary gear set and said sun gear of said third planetary gear set and being disposed radially outward of and concentric with said first sleeve shaft.

3. The powertrain having a multi-speed planetary transmission defined in claim 2 further comprising:

said first brake mechanism including a one-way device in parallel torque transmitting arrangement with a selectively engageable friction brake;

said first planetary gear set providing said first forward speed ratio during the selective engagement of said first clutch mechanism and at least the operation of the one-way device;

said first planetary gear set and said third planetary gear set cooperating to provide a second forward gear ratio during selective engagement of said first clutch mechanism and said third brake mechanism;

said first clutch mechanism and said second clutch mechanism being engaged to establish a third and direct drive forward speed ratio;

said third planetary gear set providing a fourth forward speed ratio during engagement of said third clutch mechanism and said third brake; and said third planetary gear set providing said reverse speed ratio during selective engagement of said third clutch mechanism and said first brake mechanism.

4. The powertrain having a multi-speed planetary transmission defined in claim 1 further comprising:

said first brake mechanism including a one-way device in parallel torque transmitting arrangement with a selectively engageable friction brake; and said first planetary gear set providing said first forward speed ratio during the selective engagement of said first clutch mechanism.

5. The powertrain having a multi-speed planetary transmission defined in claim 4 further comprising:

said third planetary gear set providing said reverse speed ratio during selective engagement of said third clutch mechanism and said first brake mechanism.

6. The powertrain having a multi-speed planetary transmission defined in claim 5 further comprising:

said first planetary gear set and said third planetary gear set cooperating to provide a second forward gear ratio during selective engagement of said first clutch mechanism and said third brake mechanism;

said first clutch mechanism and said second clutch mechanism being engaged to establish a third and direct drive forward speed ratio; and said third planetary gear set providing a fourth forward speed ratio during engagement of said third clutch mechanism and said third brake.

7. The powertrain having a multi-speed planetary transmission defined in claim 1 further comprising:

said first planetary gear set and said third planetary gear set cooperating to provide a second forward gear ratio during selective engagement of said first clutch mechanism and said third brake mechanism;

said first clutch mechanism and said second clutch mechanism being engaged to establish a third and direct drive forward speed ratio; and said third planetary gear set providing a fourth forward speed ratio during engagement of said third clutch mechanism and said third brake.

* * * * *